(12) United States Patent
Oukassi et al.

(10) Patent No.: US 9,373,831 B2
(45) Date of Patent: Jun. 21, 2016

(54) ARCHITECTURE WITH STACKING OF STORAGE AND/OR ELECTRICAL ENERGY GENERATING ELEMENTS WITH CONFIGURABLE ELECTRICAL OUTPUT, METHOD OF PRODUCING SUCH AN ARCHITECTURE

(75) Inventors: Sami Oukassi, Saint-Egreve (FR); Raphael Salot, Lans-en-Vercors (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 264 days.

(21) Appl. No.: 14/117,500

(22) PCT Filed: May 11, 2012

(86) PCT No.: PCT/EP2012/058788
§ 371 (c)(1),
(2), (4) Date: Nov. 13, 2013

(87) PCT Pub. No.: WO2012/156315
PCT Pub. Date: Nov. 22, 2012

(65) Prior Publication Data
US 2014/0227580 A1    Aug. 14, 2014

(30) Foreign Application Priority Data

May 13, 2011    (FR) ...................... 11 54193

(51) Int. Cl.
*H01M 10/052*    (2010.01)
*H01M 2/26*    (2006.01)
(Continued)

(52) U.S. Cl.
CPC ................. *H01M 2/26* (2013.01); *H01G 11/10* (2013.01); *H01G 11/72* (2013.01); *H01G 11/76* (2013.01); *H01M 2/204* (2013.01); *H01M 2/266* (2013.01);
(Continued)

(58) Field of Classification Search
CPC ..................... H01M 10/0436; H01M 10/0585; H01M 10/425
See application file for complete search history.

(56) References Cited

U.S. PATENT DOCUMENTS

| 8,697,287 B2 | 4/2014 | Salot et al. | |
| 2004/0021442 A1* | 2/2004 | Higashino | H01M 10/0413 320/112 |

(Continued)

FOREIGN PATENT DOCUMENTS

| FR | 2 874 128 | 2/2006 |
| WO | WO 2008/059409 A1 | 5/2008 |

OTHER PUBLICATIONS

French Preliminary Search Report issued Feb. 27, 2012 in Patent Application No. 1154193 (with English Translation of Category of Cited Documents).
International Search Report Issued Jun. 6, 2012 in PCT/EP12/058788 Filed May 11, 2012.

*Primary Examiner* — Stewart Fraser
*Assistant Examiner* — Olatunji Godo
(74) *Attorney, Agent, or Firm* — Oblon, McClelland, Maier & Neustadt, L.L.P.

(57) ABSTRACT

An electrical energy storage and/or generation device with an architecture including a stack of electrical storage and/or generation elements, such as microbatteries. An electrical connection is not made between the different stacked elements during manufacture, but subsequently with assistance of an electronic control unit to configure, in series and/or in parallel, all or a proportion of the elements, and to configure electrical outputs of the device, such as the electrical voltage or the storage capacity.

14 Claims, 3 Drawing Sheets

Figure 1:
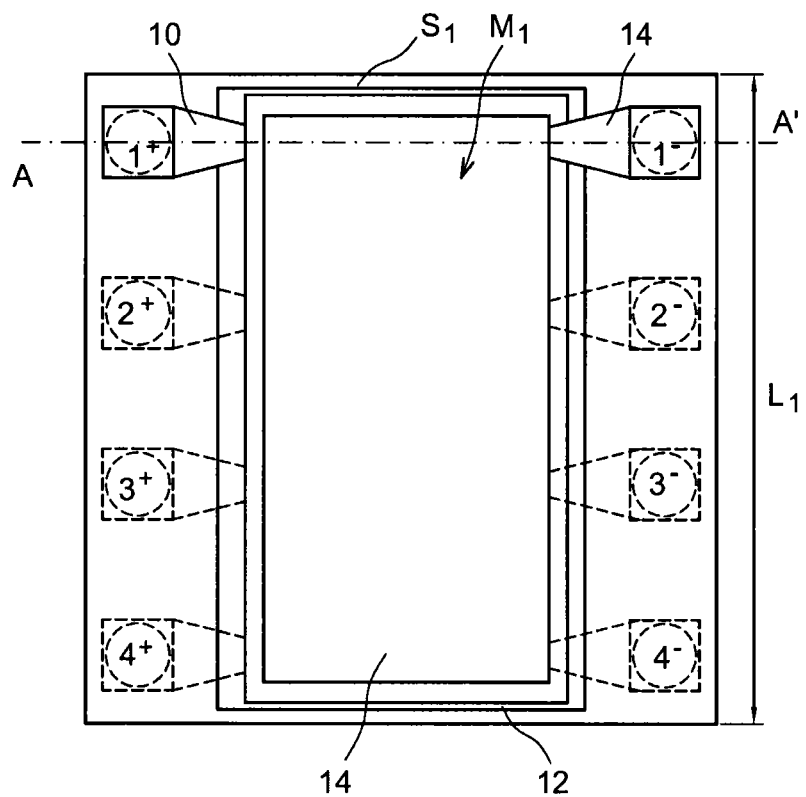

(51) Int. Cl.
- *H01M 2/20* (2006.01)
- *H01M 10/04* (2006.01)
- *H01M 10/0585* (2010.01)
- *H01G 11/10* (2013.01)
- *H01G 11/72* (2013.01)
- *H01G 11/76* (2013.01)

(52) U.S. Cl.
CPC ........ *H01M 10/0436* (2013.01); *H01M 10/052* (2013.01); *H01M 10/0585* (2013.01); *Y02E 60/122* (2013.01); *Y02E 60/13* (2013.01); *Y02P 70/54* (2015.11)

(56) References Cited

U.S. PATENT DOCUMENTS

| | | |
|---|---|---|
| 2005/0130036 A1 | 6/2005 | Li et al. |
| 2006/0216589 A1 | 9/2006 | Krasnov et al. |
| 2007/0238019 A1 | 10/2007 | Laurent et al. |
| 2008/0261107 A1 | 10/2008 | Snyder et al. |
| 2009/0029251 A1 | 1/2009 | Baba |
| 2009/0136839 A1 | 5/2009 | Kraznov et al. |
| 2010/0227214 A1 | 9/2010 | Krasnov et al. |
| 2010/0236055 A1 | 9/2010 | Baba |

* cited by examiner

ARCHITECTURE WITH STACKING OF STORAGE AND/OR ELECTRICAL ENERGY GENERATING ELEMENTS WITH CONFIGURABLE ELECTRICAL OUTPUT, METHOD OF PRODUCING SUCH AN ARCHITECTURE

TECHNICAL FIELD

The invention relates to the field of batteries, known as all-solid-state batteries, in particular micro-batteries, consisting of stacks of thin films or layers obtained by vacuum deposition techniques.

According to the habitual meaning in the field, a microbattery according to the invention is defined as a rechargeable all-solid-state electrochemical generator, some tens of micrometres thick, typically of 10 to 25 µm, having an area ranging from several $mm^2$ to several $cm^2$, and each consisting of a stack of several thin layers, one of which is a positive electrode layer, one of which is a negative electrode layer and one of which is an electrolyte layer interposed between the positive and negative electrode layers, where the other layers act as buses, protective electrical insulators and encapsulation layers.

Among the target applications for microbatteries, in addition to smart cards and smart labels, known as RFID (Radio Frequency Identification) labels, are the electrical power supply of internal clocks of electronic components and of microsystems, particularly when these are mechanical, called MEMS (Micro-Electro-Mechanical Systems).

These applications require that all the thin layers required for the operation of the microbattery are manufactured using techniques compatible with the industrial methods used in the microelectronics field.

The many applications of microbatteries require their electrical properties to be improved, notably in terms of increased capacity and output voltage.

In this context the invention relates more specifically to a storage device and/or device for generating electrical energy using storage elements and/or device for generating electrical energy having configurable electrical outputs.

Even more particularly, the electrical energy storage and/or generation elements according to the invention are microbatteries, each of which is produced on an electrically insulating support.

Although described in detail with reference to microbatteries the invention also applies to electrical storage and generation elements consisting of batteries and electrical generation elements consisting of batteries which it is sought to stack, in particular for reasons of compactness, and each of which has a positive pole and a negative pole.

PRIOR ART

"All-solid-state" microbatteries in the form of a stack of thin films are now well known. Their operating principle is based on the insertion and deinsertion (or intercalation/deintercalation) of an alkaline metal ion or of a proton in the positive electrode. The main microbattery systems use the Lithium $Li^+$ ion derived from an electrode made of metallic lithium as their ionic species. All the components of the microbattery, namely the buses, the positive and negative electrodes, the electrolyte and the encapsulation, take the form of thin layers obtained by PVD (Physical Vapour Deposition) or CVD (Chemical Vapour Deposition). The total thickness of the stack is some tens of micrometres, typically of the order of 15 µm.

Different materials may be used for the components:
the buses are metallic and may, for example, be made from Pt, Cr, Au, Ti, W or Mo,
the positive electrode may consist particularly of $LiCoO_2$, $LiNiO_2$, $LiMn_2O_4$, $CuS$, $CuS_2$, $WO_yS_z$, $TiO_yS_z$ or $V_2O_5$. Depending on the chosen materials, thermal annealing may be required to increase the crystallisation of the thin films and their insertion properties. This is notably the case with lithiated oxides. However, certain amorphous materials, in particular titanium oxysulfides, intrinsically allow high insertion of lithium ions without needing to subject them to such a thermal annealing treatment,
the electrolyte must be a good ionic conductor and electronic insulator. this is generally a vitrous material made from boron oxide, lithium oxides or lithium salts. The most effective electrolytes are made from phosphate, such as LiPON or LiSiPON,
the negative electrode may be metallic lithium deposited by thermal evaporation, a metal alloy containing lithium, or again an insertion compound (SiTON, $SnN_x$, $InN_x$, $SnO_2$, etc.). Microbatteries without metallic lithium also exist, known as "Li-free" microbatteries. In this case a layer of metal blocking the lithium is deposited. The lithium is then electroplated on this layer.
the function of encapsulation is to protect the active stack from the external environment, and specifically from moisture. Different techniques are used to produce the encapsulation: encapsulation using thin layers, encapsulation using colaminates, i.e. simultaneous lamination of two layers, or encapsulation by enclosure.

In addition, it is known that the electrical properties of microbatteries are directly related to the properties of the materials constituting them:
the voltage delivered by a microbattery depends on the materials of the positive and negative electrodes and on the techniques used in inserting the lithium ions within the crystallographic structure of the said materials. Typically, a pair of positive/negative electrodes made of $V_2O_5$/Li supplies of voltage of between 1.5 and 3.8 V; a pair made of TiOS/Li supplies of voltage of between 1 and 3V; and a pair made of $LiCoO_2$/Li supplies of voltage of between 3 and 4.2V,
the capacity stored in a microbattery depends on the nature and quantity of the materials of insertion electrodes. Typically, in the case of an electrode made of $LiCoO_2$, the volume capacity is 69 $\mu Ah/cm^2.\mu m^{-1}$; in the case of a electrode made of TiOS it is 80 $\mu Ah/cm^2.\mu m^{-1}$. In addition, the proportionality between the quantity of material, i.e. essentially the thickness given a constant area, and the storage capacity is generally non-linear.

Certain applications, which require specific electrical characteristics, consequently often require that several microbatteries are connected to one another, either in a series configuration or in a parallel configuration. Thus, by connecting microbatteries with one another in series or in parallel, electrical power conditions which cannot be achieved solely with the intrinsic properties of materials, even when they are efficient (high voltage, high-capacity, etc.), when used in a single microbattery, may be met.

The number of solutions for connecting several microbatteries to one another have previously been proposed in the prior art, to meet these electrical power conditions which cannot be achieved with a single microbattery.

It is also known to produce an architecture with a stack of microbatteries connected to one another, in order to make them more compact.

Architectures with a stack of microbatteries connected to one another may be divided into two separate categories.

The first category may be qualified as an architecture by heterogeneous integration, since each microbattery is produced on its own support, and the final architecture is produced by integration, where all the microbatteries are connected to one another. In other words, in this first category the following steps are undertaken:
- deposition of the thin layers of each individual microbattery on the same substrate,
- cutting of the said common substrate supporting all the produced microbatteries,
- after the cutting, electrical connection of the microbatteries to one another.

One may cite in this first category patent application US 2009/0136839, which discloses an architecture with a stack of microbatteries and its method of production, where the microbatteries may, in this architecture, be connected to one another either solely in series, or solely in parallel, as shown in FIG. 5. The architecture proposed according to this application US 2009/0136839 has certain technical limitations, and most specifically:
- a fixed configuration of the electrical connection of the microbatteries. Indeed, the microbatteries are connected physically by materials derived from the steps of deposition and etching which form integral parts of the manufacturing method. The configuration of this connection cannot consequently be changed after manufacture to obtain a different output voltage or capacity. It is also impossible to disconnect a defective microbattery from the formed micro-source of electrical energy and, hence, the remainder of the functional microbatteries, i.e. those which are still in an operational condition, cannot be used.
- a low volume energy density of the micro-source of electrical energy formed, given the presence of an intermediate layer made of epoxy resin between two adjacent, stacked microbatteries.

In this first category, patent application US 2009/0029251 may also be cited, which discloses an architecture comprising a stack of microbatteries connected to one another by means of their supports, which are all electronic conductors. The volume energy density with the architecture proposed according to this application may be considered as better than that which was mentioned above, given that in this case the supports also constitute a bus. Conversely, the proposed architecture has the same technical limitation of a fixed configuration of the connection of the microbatteries, therefore making it impossible to configure the connection after manufacture.

Finally, in this first category other examples of known architectures may be cited, such as those disclosed in patent applications US 2008/0261107 and US 2006/0216589, which have the same technical limitation, i.e. an electrical connection which is definitively fixed during the manufacturing method and, consequently, where it is impossible to configure as desired the electrical output properties of the formed micro-source of electrical energy, i.e. its output voltage and its discharge capacity.

The second category may be qualified as an architecture by monolithic integration since in this category the microbatteries are produced individually by deposition on a given substrate, where the stacking of the microbatteries on one another is accomplished in certain thin layers of the adjacent microbatteries. In this second category, there is thus no step of cutting or step of subsequent connection to be accomplished. In other words, that which distinguishes an architecture according to the second category from an architecture according to the first category is that the ultimately constituted micro-source of energy includes a single substrate on which all the thin layers constituting all the microbatteries are deposited, whether or not directly.

Patent application WO 2008/059409 may be cited, which discloses an architecture with a stack of microbatteries of the second category. The embodiment illustrated in FIG. 1 of this application WO 2008/059409 relates to a micro-source of energy with four microbatteries, divided into two separate stacks of microbatteries, one on top of the other, where the two separate stacks are positioned on the same substrate. The two microbatteries stacked on top of one another are separated by an intermediate layer made of an electron-conductive material, acting both as the electrical connection, in this instance a connection in series, and as a barrier against the diffusion of the $Li^+$ ions. The output voltage may be configured by using an electronic control unit which allows switching to the micro-source's different output pads.

The architecture proposed according to this application WO 2008/059409 has certain technical limitations, more specifically:
- a fixed configuration of the connection at least in terms of the stacked microbatteries, given that they are connected in series by the intermediate layer made of an electron-conductive material,
- limitations of a physicochemical nature. Firstly, the number of materials which can be used for this architecture is limited. For example, a stack cannot be made of two microbatteries with a positive electrode material such as $LiCoO_2$. Indeed, $LiCoO_2$ requires high-temperature (700° C.) activation annealing, which is incompatible with the presence of a layer such as the LiPON electrolyte within the stack during this annealing. In addition, it is necessary, at each step of deposition of a given layer, that the deposition gas used is compatible with the layers previously deposited on the substrate. Finally, the total stack has a high level of mechanical stresses.

The aim of the invention is to propose an electrical energy storage and/or generation device using an architecture having a stack of energy storage and/or generation elements, notably microbatteries, which compensates for all or some of the technical limitations of the solutions according to the prior art and, more particularly, which allows configurable electrical outputs.

ACCOUNT OF THE INVENTION

To accomplish this, one object of the invention is an electrical energy storage and/or generation device including multiple electrical energy storage and/or generation elements, where there are N such elements, where each is produced on a support and where they are stacked one on top of another.

According to the invention:
- each support has, at the periphery of the thin layers composing the supported element, multiple pads made from an electron-conductive material, where there are X*N such pads, traversing the said support, where there are X1 pads connected to the positive bus(es) of the supported element, and where there are X2 pads connected to the negative bus(es) of the supported element, and where the sum of X1+X2 is equal to X,
- all the pads, where there are X*N such pads, are positioned with roughly the same relative mutual positioning, whatever the support, each pad connected to the bus, respectively positive and negative, of a support is positioned in a position which is different from a pad connected to the bus, respectively positive and negative, of another support, all the supports, where there are N such supports, are stacked with the pads aligned with one another in a number equal to N in the stacking direction, where the pads aligned in a number equal to N are also connected to one another.

According to an advantageous characteristic, numbers X1 and X2 of pads connected to the respectively positive and negative bus(es) of the supported element are each equal to half X, i.e. X/2.

More particularly, the electrical energy storage and/or generation elements according to the invention are microbatteries, each of which is produced on an electrical insulator support or on an electrical conductor support covered at least locally by an electrical insulating film able to prevent any short-circuiting between pads and between microbatteries and pads.

All the supports are advantageously made of the same substrate.

All the supports of the stacked elements are preferably bonded to one another.

In the configuration in which each electrical storage and/or generation element, such as a microbattery, extends beyond its support, it is advantageously provided that each through pad is surmounted by an additional pad the height of which is at least equal to the height of the electrical storage and/or generation element protruding from the support.

In the configuration in which each electrical storage and/or generation element, such as a microbattery, is recessed in its support, the additional pads are no longer necessary. Similarly, in a configuration in which a cavity is to be made in the underside of an upper adjacent support in which the element, such as a microbattery, supported by a lower support, is to be housed during stacking, then the additional pads are no longer necessary.

The supports of the stacked elements are preferably bonded to one another by an insulating adhesive.

According to one variant, all the thin layers of the stacked elements having the same function are deposited with the same material and the same thickness.

According to an alternative, all the thin layers of the stacked elements having the same function are deposited with a different material and/or a different thickness.

All the pads at the top or at the bottom of the stack are preferably connected individually to a tab of a seat of a unit B, of the integrated circuit unit type.

According to a variant, the individual connection between each pad at the top or at the bottom of the stack and the tab may be a wired connection.

According to an alternative variant, the individual connection between each pad at the top or at the bottom of the stack and the tab may be flip chip bonding.

The invention therefore essentially consists in producing an electrical energy micro-source with a stacked architecture according to the first category mentioned in the preamble, but with electrical outputs which may be configured by series and/or parallel connection of all or a proportion of the microbatteries with one another.

In other words, the invention consists essentially in the fact that the microbatteries are not electrically connected to one another within the stack, until the end of the manufacturing process. Each microbattery thus has at least two independent positive and negative output buses, the outputs of all the microbatteries being positioned, ultimately, in a single plane, on top of or underneath the stack. When manufacturing is completed, i.e. when the stack has been produced and the electrical connection between the pads has been made within the stack, the outputs are also connected to a suitable electronic control unit to configure the different possible output combinations.

Another object of the invention is a system including an electrical energy storage and/or generation device as described above, and an electronic control unit connected to all the pads at the top or at the bottom of the stack of electrical storage and/or generation elements, where the electronic control unit is able to switch all or a proportion of the buses of the elements to one another in electrical series and/or parallel.

BRIEF DESCRIPTION OF THE ILLUSTRATIONS

Figure 1A:
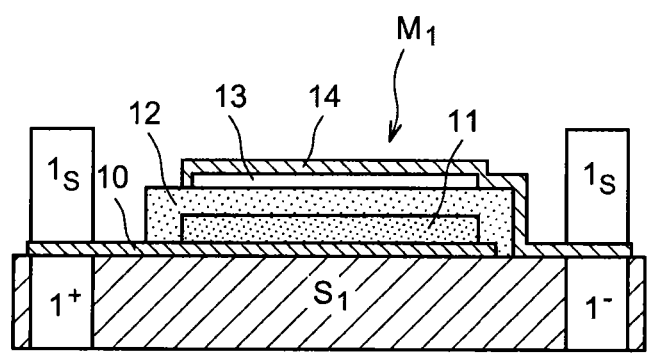

Other advantages and characteristics of the invention will emerge more clearly on reading the detailed description of an embodiment of the invention, given as an illustration and not restrictively, with reference to FIGS. 1 to 2 D, among which:

FIGS. 1 and 1A show respectively as a top view and as a section view along axis A-A' an individual microbattery M1 according to the invention, FIGS. 2A to 2D show the different steps of production of an electrical energy and storage device from three individual microbatteries M1, M2, M3 produced in accordance with FIGS. 1 and 1A.

DETAILED DESCRIPTION OF PARTICULAR EMBODIMENTS

Microbattery M1 includes in successive order of stacking of the thin layers from its support S1 made of electrically insulating material:

a thin layer 10 constituting a first output bus, directly deposited on support S1, a thin layer 11 constituting the positive insertion electrode, deposited on bus 10, a thin layer 12 constituting the solid electrolyte, deposited on and surrounding positive electrode 11, a thin layer 13 constituting the negative insertion electrode, deposited on electrolyte 12, a thin layer 14 constituting second output bus 14, deposited on and surrounding negative electrode 12.

As an example:

thin layer 11 is a layer 1 to 3 µm thick made of LiTiOS, thin layer 12 is a layer 1 to 2 µm thick made of LiPON, thin layer 13 is a layer 50 nm to 1 µm thick made of Si, each of thin layers 10 and 14 is a layer of the order of 250 nm thick made of Ti.

There may be encapsulation with an individual microbattery or with a stack of microbatteries forming electrical storage and generation device M according to the invention.

Support S1 also includes through holes 1, 2, 3, 4, each being filled with an electron-conductive material, and each forming a pad. These pads are habitually known by the name of vias in the microelectronics field. These vias therefore allow electronic conduction.

As represented in FIGS. 1 and 2, the support includes a number of vias equal to eight, divided into two equal groups $1^+, 2^+, 3^+, 4^+; 1^-, 2^-, 3^-, 4^-$ either side of the periphery of the stack of thin layers 10, 11, 12, 13, 14 constituting microbattery M1. Even more accurately, four, $1^+, 2^+, 3^+, 4^+$, are installed on an edge of the stack of thin layers, and the other four, $1^-, 2^-, 3^-, 4^-$, are installed on the opposite edge in the direction of length L1 of deposition of the said layers.

In the context of the invention, the number of vias may vary, and depends on number N of microbatteries to be stacked subsequently to constitute an electrical energy microsource in accordance with the invention. Typically, the number of vias is at least equal to twice the number N of microbatteries to be stacked, if it is chosen to attribute two output buses $1^+, 1^-; 2^+, 2^-; 3^+, 3^-$ for each microbattery to be stacked. More generally, in accordance with the invention, for each microbattery, a number of vias equal at minimum to total number N of microbatteries to be stacked multiplied by number X of output buses desired for each individual microbattery, i.e. a number at least equal to X*N, are produced. In other words, if each individual microbattery has a number equal to X1 positive pads and a number equal to X2 negative pads, it is then necessary in the context of the invention to have a number equal to (X1+X2)*N pads for each support.

It may also be of interest to have several pads for a given bus. Thus, for example, an electrical storage and/or generation element, such as a microbattery, may be connected to another electrical device not connected to the load of the element, to allow the element to be supervised automatically, to make monitoring measurements of it, etc.

In the section view according to FIG. 1A it can also be seen that an additional thin layer 1S made of an electron-conductive material has been deposited selectively above each of vias $1^+, 2^+, 3^+, 4^{+;} 1^-, 2^-, 3^-, 4^-$. As is explained more fully below, these additional selective pads 1S made of an electron-conductive material have a function during the step of bonding the stack of microbatteries M1, M2, M3 to one another.

As may be seen in FIG. 1, produced vias $1^+, 2^+, 3^+, 4^{+;} 1^-, 2^-, 3^-, 4^-$ are, for a given microbattery M1, of the same dimensions, and made from the same constituent material. They are also aligned in groups of four at a roughly equal distance to the edge of the electrolyte. Other dimensions, different constituent materials and another positioning on a given support may be envisaged. Conversely, as can better be seen below, in the context of the invention all the vias, where there are X*N such vias, are roughly positioned according to the same relative positioning to one another, whatever support S1, S2, S3.

In the case of microbattery M1 represented in FIGS. 1 and 1A, the respectively positive 10 and negative 14 output buses are each connected to a single via $1^+, 1^-$ produced at the end of the alignment. This enables the electrical connection to be moved vertically relative to support plane S1 of microbattery M1. It may be made possible to reverse the connection, i.e. with positive bus 10 connected to via $1^+$ at the right of FIG. 1 and, respectively, negative bus 14 connected to $1^-$ at the left of this FIG. 1.

Figure 2A:
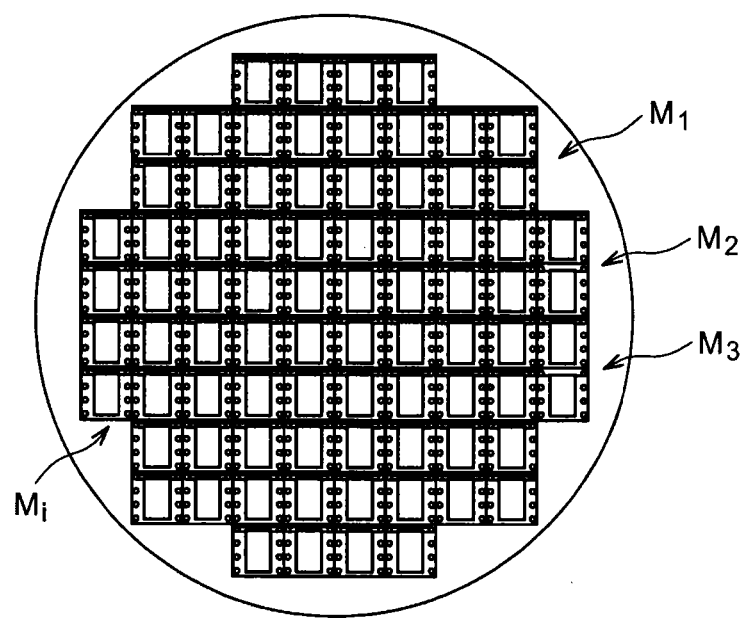
Figure 2B:
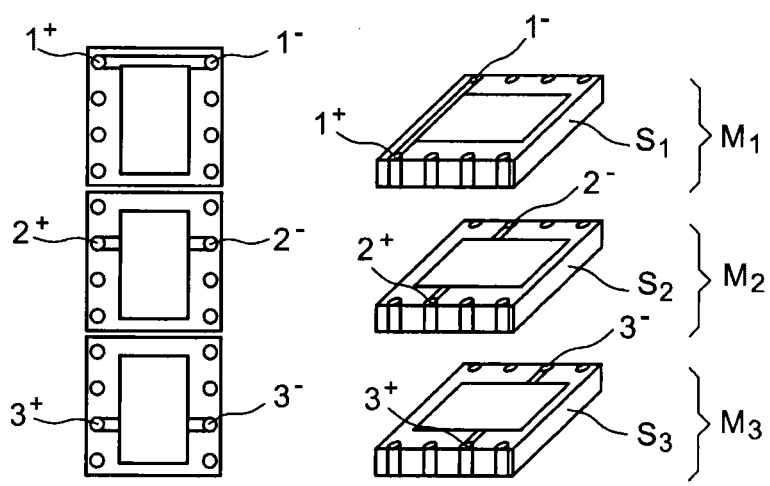
Figure 2C:
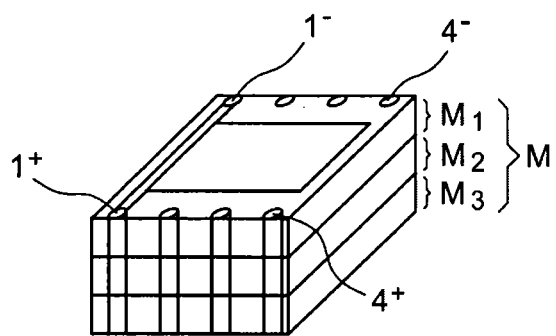

As can be seen more easily in the top view of FIG. 2B, an identical relative positioning is chosen for all vias $1^+, 2^+, 3^+, 4^{+;} 1^-, 2^-, 3^-, 4^-$ of a given support S1, S2, S3. When the microbatteries are stacked with their associated support on one another, all the vias are thus positioned vertically relative to one another in the stack direction by a number N of microbatteries. Conversely, for each microbattery which is to be stacked a different via-output bus electrical contact position is defined. The electrical connection is thus made between respectively positive 10 and negative 14 buses with:

vias $1^+, 1^-$ for microbattery M1,
vias $2^+, 2^-$ for microbattery M2,
vias $3^+, 3^-$ for microbattery M3.

In other words vias $4^+, 4^-$ are not connected to any positive bus 10 or negative bus 14 for all the microbatteries which are to be stacked.

In this manner the stack of microbatteries according to the invention enables all the positive and negative output buses to be moved vertically from the support plane of each microbattery to the plane at the top and/or at the bottom of the stack, and by this means enables the constituted micro-source of energy to be connected to an electronic control unit. Such an electronic control unit then allows switching between the different possible combinations, i.e. switching to different possible electrical connections between the output buses of the microbatteries, and hence to configure as desired the output voltage level or the storage capacity.

FIGS. 2A to 2D show the different manufacturing steps to obtain completely the architecture with a stack of three microbatteries M1, M2, M3 according to the invention.

Attention is drawn to the fact that, unlike the configuration according to FIGS. 1 and 1A, in which microbattery M1 protrudes from its support S1 and in which the presence of additional pads 1S is desirable, microbatteries M1, M2, M3 according to FIGS. 2A to 2D are recessed in their respective supports.

The first step consists in producing all the vias $1^+, 2^+, 3^+, 4^{+;} 1^-, 2^-, 3^-, 4^-$ in an identical substrate S made of an electronic insulating material, and in depositing all the thin layers constituting all the microbatteries M1, M2, M3, Mi on the said substrate (FIG. 2A). In this case, for the sake of clarity, it is considered that each deposited thin layer 10, 11, 12, 13, 14 having the same function (positive bus, positive electrode, solid electrolyte, negative electrode, negative bus) is produced with the same thickness, and from the same constituent material in all the microbatteries. The substrate may be Si, glass, etc. An electron-conductive substrate may be envisaged: it is then covered at least locally by a electric insulating film able to prevent any short-circuiting between the microbattery and the pads, and between the pads.

As explained above, and due to the different via-bus contact position of a microbattery with its support to another, only the buses' layouts differ from one microbattery to another. This layout may be modified, preferably during a step of photolithography.

The second step consists in cutting individually microbatteries M1, M2, M3 . . . Mi produced from the same substrate S, and in classifying them by the position they are to take in the stack according to the layouts of the via-output bus contacts. Thus, as shown in FIG. 2B, the following are placed in this successive stacking order:

microbattery M1 cut and produced with end vias $1^+, 1^-$ connected to its two buses, respectively positive bus 10 and negative bus 11 above, adjacent microbattery M2 beneath microbattery M1, where microbattery M2 is cut and produced with its vias $2^+, 2^-$ immediately next to its vias $1^+, 1^-$ and connected to its two buses, respectively positive bus 10 and negative bus 11, adjacent microbattery M3 beneath microbattery M2, where microbattery M3 is cut and produced with its vias $3^+, 3^-$ immediately next to its vias $2^+, 2^-$ and connected to its two buses, respectively positive bus 10 and negative bus 11.

Attention is drawn to the fact that, before cutting common substrate S, a step of thinning of this substrate may be implemented.

The third step consists in bonding microbatteries M1, M2, M3 to one another to finalise the stacking architecture according to the invention. When the bonding step has been implemented (FIG. 2C), the electrical connection between vias of the same position in their support S1, S2, S3 must be made. In other words, at the end of the step of bonding all the vias referenced 1+, 1−; 2+, 2−; 3+, 3−; 4+, 4− of a given support S1, S2, S3 are electrically connected to those which are referenced identically of another support. Or, to put it in another way, all the vias of an identical given position for all the supports are connected electrically to one another in the stacking direction, but only one of them is connected to a positive bus, and only one of them is connected to a negative bus. This bonding step may be accomplished using several technologies. Preferably, a step of bonding by solid phase diffusion is accomplished, i.e. a metal-metal bonding with formation of intermetallic compounds following the application of mechanical pressure at a suitable temperature. This step of bonding may be accomplished between additional pads 1S made of electron-conductive material deposited on a given support S2, for example, and vias 1+, 1− of support S1 stacked above. A step of connection/bonding between supports S1, S2, S3 may also be accomplished by flip chip means, or by means of a film called an Anisotropic Conductive Film (ACF), deposited either over the entire support, or locally on the vias.

At the end of the physical stacking between microbatteries M1, M2, M3 and the electrical connection between their vias of same position in the stacking direction, a micro-source of electrical energy M according to the invention has been obtained.

Figure 2D:
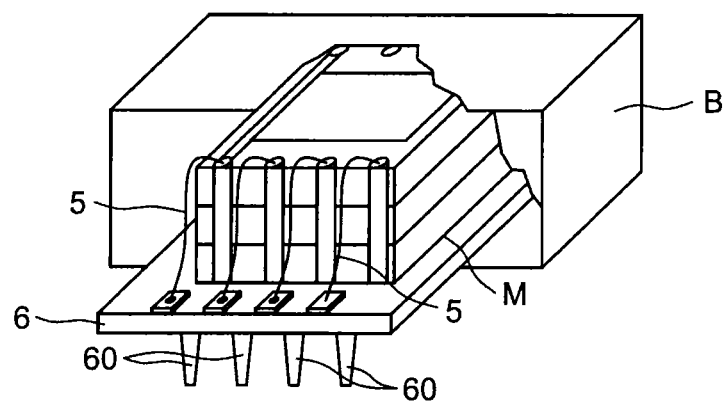

The fourth step consists in finalising the connection of micro-source M. The aim in this case is to connect individually all the vias referenced 1+, 1−; 2+, 2−; 3+, 3−; 4+, 4− of microbattery M1 at the top of the stack, to a tab 60 of a seat 6 of a unit B, of the integrated circuit unit type. As shown in FIG. 2D this connection may be made between a via and tab 60 using a wire bonding technique 5. Other techniques can also be envisaged to produce this connection such as, for example, a flip chip bonding technique.

Once micro-source of electrical energy M has been produced in this manner with its external connections 60, a subsequent connection with an unrepresented electronic control unit enables all or a proportion of the buses of the microbatteries to be connected to one another in electrical series and/or parallel. In other words, it is possible to switch to the different possible combinations between microbatteries M1 to M3 and to configure, for example, the output voltage level or the storage capacity.

For example, to put the three microbatteries M1, M2, M3 in electrical parallel, outputs 1−, 2−, 3− are connected to the same first external terminal, and outputs 1+, 2+, 3+ are connected to a same second external terminal.

As another example, to put microbattery M1 in electrical series with microbattery M3, output 1− is connected to a first external terminal, outputs 1+ and 3− are connected together, and finally output 3+ is connected to the second external terminal.

The invention described in this manner has the following advantages:
the electrical outputs may be configured in accordance with the application in question,
output possibilities may be increased by stacking microbatteries having electrodes with different insertion materials. For example, two microbatteries installed in series may be used, each constituted with a pair of positive/negative electrodes made of Si/Li to power an output voltage of 0.4 V, and three other microbatteries installed in series, stacked with the two first batteries, and each constituted with a pair of positive/negative electrodes made of $LiCoO_2/Li$, may be used to power at an output voltage of 11.4 V,
there may simultaneously be two or more outputs with different electrical characteristics, with outputs which do not use a microbattery of the stack common to them.

Other variants and improvements may be envisaged in connection with the invention. Thus, for example, if the pads referenced $4^+$, $4^−$ are not connected to any bus of a microbattery, this may however be envisaged, i.e. it may be provided that all the vias produced in each support act as a contact to a bus of a given microbattery.

As previously mentioned above, a stack of several microbatteries formed with stacks of different thin layers may be envisaged, in particular when it is sought to have two different levels of output voltage. One or more microbatteries of the Li/LiPON/TiS type on one or more microbatteries of the $Li/LiPON/LiCoO_2$ type may thus be stacked.

The invention claimed is:

1. A battery device, comprising:
a plurality of supports of number N;
a plurality of electrical energy storage and/or generation elements of the same number N, stacked one on top of another, each element of the plurality of elements being disposed on a support of the plurality of supports and comprising a plurality of thin layers, the plurality of thin layers being a supported element; and
a plurality of pads of an electron-conductive material disposed at a periphery of the plurality of thin layers at each support of the plurality of supports and traversing said each support,
wherein there are X*N number of pads in the plurality of pads, including X1 number of pads connected to a positive bus of the supported element and X2 number of pads connected to a negative bus of the supported element, such that a sum of X1+X2 is equal to X, where X and N are nonzero integers,
wherein the X*N number of pads are disposed at about the same relative positions among each of the supports along a stacking direction of the supports, such that each of the X1 number of pads connected to the positive bus of the supported element is disposed in a different position than each of the X2 number of pads connected to the negative bus of the supported element,
wherein the N number of supports in the plurality of supports are stacked with the X*N number of pads in the plurality of pads and aligned with one another in the stacking direction, and
wherein the X*N number of pads are also connected to one another in the stacking direction.

2. The battery device according to claim 1, wherein the X1 number of pads and the X2 number of pads are each equal to X/2.

3. The battery device according to claim 1, wherein the electrical energy storage and/or generation elements are microbatteries, each of the microbatteries being disposed on an electrical insulator support or on an electrical conductor support and covered at least locally by an electrical insulating film configured to prevent short-circuiting between pads of the plurality of pads and between the microbatteries and said pads.

4. The battery device according to claim 1, wherein the plurality of supports are from a same substrate.

5. The battery device according to claim 1, wherein the N number of supports in the plurality of supports of the stacked elements are bonded to one another.

6. The battery device according to claim 1, wherein each pad of the X*N number of pads is surmounted by an additional pad having a height that is at least equal to a height of one of the electrical storage and/or generation elements disposed on one of the supports.

7. The battery device according to claim 1, wherein the N number of supports in the plurality of supports of the stacked elements are bonded to one another by an insulating adhesive.

8. The battery device according to claim 1, wherein individual layers within the plurality of thin layers of one of the stacked elements are respectively deposited with a same material and a same thickness as corresponding other individual layers within the plurality of thin layers of another of the stacked elements.

9. The battery device according to claim 1, wherein individual layers within the plurality of thin layers of one of the stacked elements are respectively deposited with a different material and/or a different thickness as corresponding other individual layers within the plurality of thin layers of another of the stacked elements.

10. The battery device according to claim 1, wherein pads at a top or at a bottom of the stack are connected individually to a tab of a seat of an integrated circuit unit.

11. The battery device according to claim 10, wherein an individual connection between each of the pads at the top or at the bottom of the stack and the tab is a wired connection.

12. The battery device according to claim 10, wherein the individual connection between each of the pads at the top or at the bottom of the stack and the tab is a flip chip bond.

13. A system including a battery device according to claim 1, further comprising an electronic control unit connected to pads at a top or at a bottom of the stack of electrical energy storage and/or generation elements, wherein the electronic control unit is configured to switch all or a proportion of the positive and negative buses of the elements to one another in electrical series and/or in parallel.

14. The battery device according to claim 1, wherein the electrical energy storage and/or generation elements are microbatteries.

* * * * *